May 13, 1969  R. LEGER  3,444,338

SAFETY DEVICES FOR POWER TAPS FROM OVERHEAD LINES

Filed May 17, 1966  Sheet _1_ of 5

Inventor

Roland Leger
Schlesinger, Arkwright & Garvey
Attorneys

United States Patent Office 3,444,338
Patented May 13, 1969

3,444,338
SAFETY DEVICES FOR POWER TAPS
FROM OVERHEAD LINES
Roland Léger, Paris, France, assignor to Etablissements
L. Faiveley, Saint-Ouen, France
Filed May 17, 1966, Ser. No. 550,701
Claims priority, application France, May 21, 1965,
17,928
Int. Cl. B60l 5/26, 5/30
U.S. Cl. 191—66                                              11 Claims

ABSTRACT OF THE DISCLOSURE

A safety device for half-pantographs, the triggering device thereof being triggered in response to abnormal forces in any of a plurality of directions, supported and transmitted by the pantograph counter-lever to an articulated retracting mechanism.

---

The invention relates to power taps from overhead lines and more particularly to restricting damage in the case of accidental contact between the power take-off and the catenary. In order to prevent destruction of substantial lengths of the line, it is necessary to cause the rapid lowering of the device supporting the actual power take-off.

This problem has already been solved for conventional symmetrical pantographs in the form of a device which, in the presence of an abnormal horizontal force, causes the rupture of a so-called "breaking part" which separates the moving part of the pantograph from its supporting springs and results in its being lowered.

Here, the solution offers no special difficulties, since the devices have a great many connections. The "breaking part" is located in the rod which transmits the movement from one rocker to the other symmetrical one.

This solution is not suitable for so-called asymmetrical or semi-pantographs, comprising a support rod for the collector, articulately mounted on a rocker and on a counter rocker.

The invention has the object of providing a solution for the safety device for semi-pantographs and consists in using the abnormal force, which, in the case of accidental oscillations is supported by the counter-rocker, for actuating the safety device, which may be of any kind, and lowering the supporting arrangement of the collector.

The invention will be further described, merely by way of example, and in a non-limitative manner, with reference to the embodiments shown in the accompanying drawings, in which:

FIG. 1 shows a very modern and up-to-date pantograph, for example such as described in U.S. Patent 2,935,576.

Figure 1:
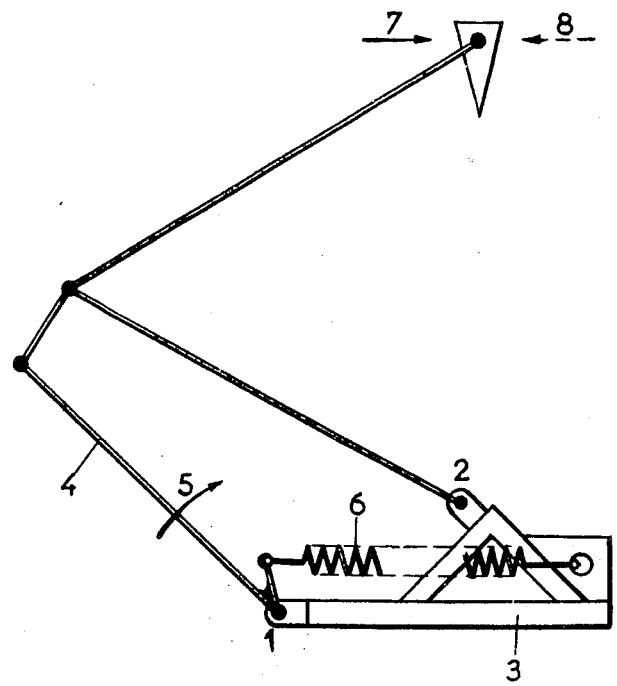
FIG. 1 shows generally a semi-pantograph of the type for which the present invention is intended.

The articulated system is connected to a frame 3, mounted on the roof of a locomotive, not shown, by two articulated links, the rocker and the counter rocker the articulations 1, 2 of which are fixed relative to 3; the arm 4, and the whole system are urged in the direction of the arrow 5 by support spring 6.

The usually pneumatic control system is not shown in the drawing. Generally the control acts in the upward direction and against the action of a counter spring, which tends to return the system to the lowered position when the positive control action is discontinued.

An abnormal force, shown at 7 or at 8, and caused by a snag or fault in the line, may cause the destruction of the line and of the pantograph.

Figure 2:
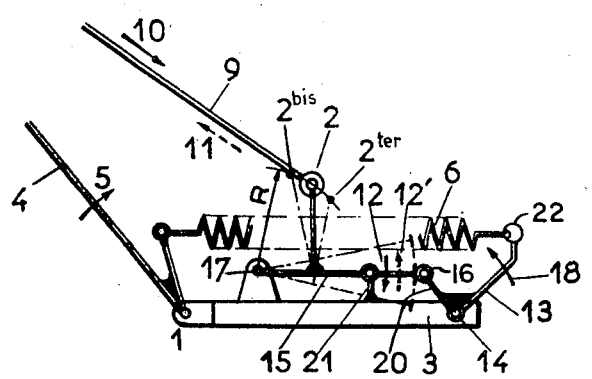
FIG. 2 shows diagrammatically a first embodiment of the invention.

The device of FIG. 2 shows the incorporation of a "fracturing member."

In contradistinction with FIG. 1, in which the articulation 2 is fixed relative to the frame 3, the articulation 2 may be regarded as fixed only under normal operating conditions, that is, when the forces 7 and 8 are lower than the breaking force of the fracturing member. In the case of an obstruction, the counter rocker 2 undergoes very large stresses, directed as indicated by the arrows 10 and 11, either in compression or in tension, causing the point 2 to be displaced either to 2b or to 2c wherein these points are located on the circumference with the radius R.

The attachment of the spring 6, instead of being fixed relative to the frame 3 is mounted at the end 22 of an angled lever 13 which can pivot about an axis 14 fixed relative to the frame 3; the arm 20 carries at its end a roller 16 which rests on the free end of a lever 15, articulated at 17 about an axis, fixed relative to the frame 3.

The lever 15 cannot shift during normal operation and is held on the frame by a member 21 which is suitably dimensioned, and may be called a "fracturing member." Under the effects of an abnormal force at 7 or 8, acting at 10 or 11, the member 15 pivots as shown by the arrows 12 or 12', owing to the fracture of the fracturing member 21. The roller 16 leaves the end of the lever 15, the lever 13 pivots along the arrow 18, the spring 6 assumes a rest position, thus allowing the lowering of the pantograph.

Figure 5:
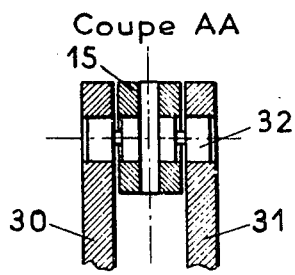
FIG. 5 is a cross-section along the line A—A in FIG. 3.

The fracturing member is shown in cross section in FIG. 5. The arrangement accordingly comprises two supports 30 and 31 integral with the frame 3 to form an axis 32, passing through the lever 15. The drawing shows the hole for the pin, the pin itself is not shown.

The axis 32 has two sections with smaller diameter so dimensioned that they fracture under a predetermined shearing stress.

Figure 3:
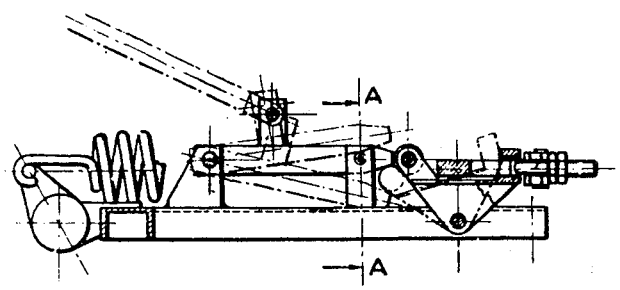
FIG. 3 is an elevational view of a practical embodiment of FIG. 2.
Figure 4:
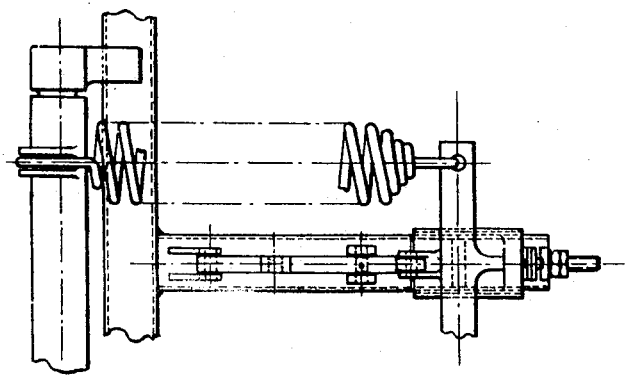
FIG. 4 is a plan view of FIG. 3.

FIGS. 3 and 4 are clearly comprehensible with reference to the diagram of FIG. 2.

Figure 7:
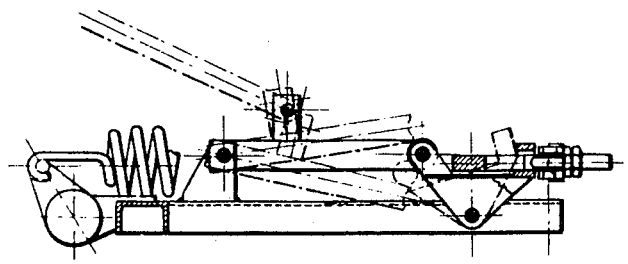
FIGS. 7 and 8 show, in elevation and plan view, respectively, a practical embodiment of the invention.
Figure 6:
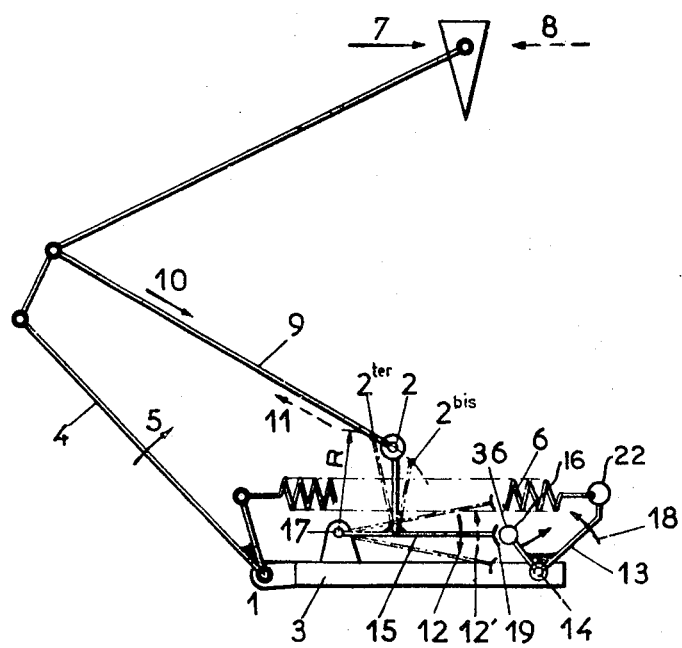
FIG. 6 is a diagrammatical view of a further embodiment of the invention.
Figure 8:
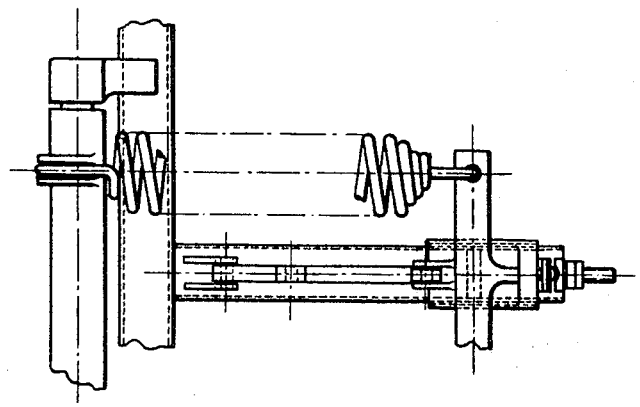
Figure 9:
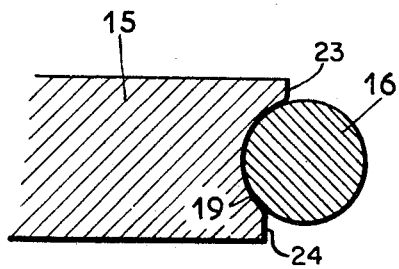
FIG. 9 shows diagrammatically a detail of an embodiment of the invention.

The arrangement of FIGS. 6 to 8 is better than the arrangement just described in which the fracturing member functions as an "all-or-nothing" system, whilst the device of FIGS. 6 to 8 presents a "dead point" system.

As may be seen from FIG. 6 (in which the same reference numerals have been used for equivalent parts), the fracturing member has been omitted and has been replaced by a toggle joint, the roller 16 has been replaced by a ball joint 36, seated in a spherical socket or cylindrical socket 19 located at the free end of the lever 15. The ball 16 is dislodged from the socket against the action of the spring 6 at a dead point. FIGS. 7 and 8 are clearly comprehensible from the diagram in FIG. 6.

It should be noted that the values of the forces 10 and 11 can differ substantially for equal values of the forces 7 and 8, and there is the possibility with the arrangement shown at 9 to provide sockets 19 of unsymmetrical shape so that the freeing at dead point takes place for the same forces 7 and 8. To this end it is sufficient for the members 23 and 24 to be conveniently rated.

Figure 10:
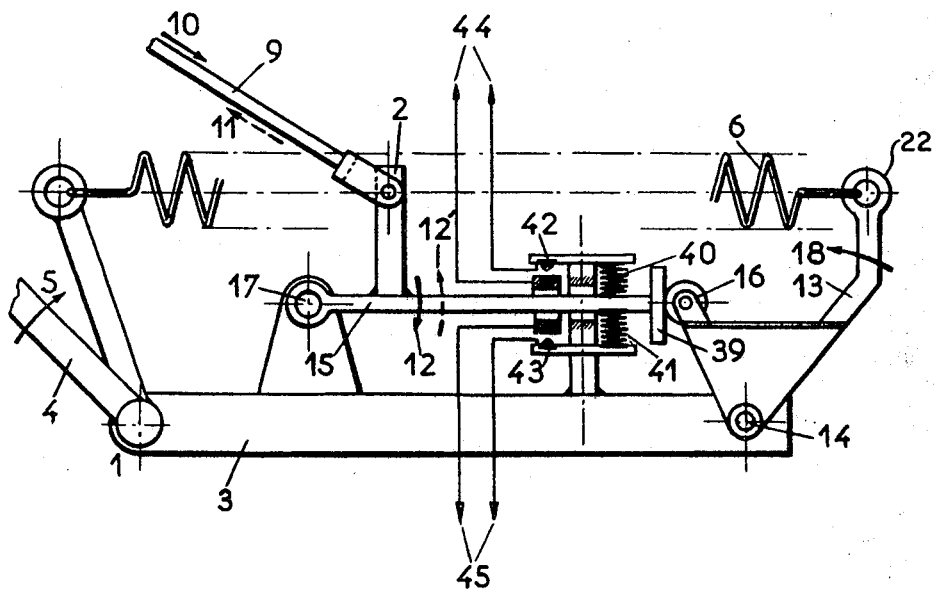
FIG. 10 shows diagrammatically yet another embodiment of the invention.

The embodiment shown in FIG. 10 offers even more freedom in that sense that the characteristic of the spring 6 can be accordingly dimensioned, which fulfills only the functions of support.

Here again, a roller 16 is used, resting on a disc 39 integral with the lever 15, and two springs 40, 41 oppose the movement of the lever 15 in the direction of the arrows 12, 12′.

There is no difficulty in modifying the diagram so as to make the tensions of the springs 40 and 41 adjustable individually, and this is known in the art.

Moreover, FIG. 10 includes also a facultative arrangement, the dimensions of the disc 19 can be so calculated that the roller 16 escapes from the disc or not. The first case relates to the embodiment shown in the preceding figures; the second case, shown here, provides two travel limit switches 42, 43 which close, respectively, circuits 44, 45, which actuate in parallel an electro-valve not shown, which, as known per se controls the purging of the pneumatic motor, not shown. When one of the said circuits is closed, the pantograph is lowered by the same means as are used for the intentional lowering of the pantograph.

This solution may be employed by providing a slower response time than in the preceding solutions. However, this drawback may be eliminated in accordance with the disclosure of French Patent No. 1,415,539 of Apr. 16, 1964, filed by the applicants under the title, "Improvements to Fluid Controls."

According to another embodiment of the invention, the counter lever 9 is replaced by a device giving an electrical information when abnormal stresses occur affecting the said rod either in compression or in tension. Such a device may be, for example, an extensometric gauge or a piezometric device, which are known per se.

What is claimed is:
1. A pantograph for a current collector from an overhead electric line comprising:
    (a) a current collector,
    (b) an articulated support for said current collector,
    (c) said articulated support comprising:
        (1) a common rod,
        (2) a lever, and
        (3) a counter-lever,
        (4) said lever and said counter-lever adapted to pivot about first and second relatively fixed parallel axes respectively, and
        (5) said common rod adapted to articulate on said lever and said counter-lever,
    (d) elastic means adapted to maintain said collector, in the extended position, under pressure against said electric line,
    (e) a safety device,
    (f) a triggering device for said safety device, and
    (g) said safety device including means to retract at least a part of said articulated support in response to the application of abnormal forces to said triggering device through said counter-lever.

2. A pantograph as set forth in claim 1, wherein,
    (a) said abnormal forces may act in a plurality of directions.

3. A pantograph as set forth in claim 1, wherein:
    (a) said safety device comprises a spring supporting at least part of the weight of said pantograph when said pantograph is in the extended position.

4. A pantograph as set forth in claim 3, wherein:
    (a) said safety device comprises a snap-action means operable in response to the action of said spring,
    (b) said safety device being mounted between said second relatively fixed axis and one end of said spring,
    (c) so as to support said second axis.

5. A pantograph as set forth in claim 4, wherein:
    (a) said snap-action means includes a member adapted to rupture under abnormal forces,
    (b) said snap-action means being normally in a balanced, unstable state and opposing the upsetting of the equilibrium.

6. A pantograph as set forth in claim 5, wherein:
    (a) said snap-action means comprises:
        (1) a first lever pivotable about a relatively fixed point,
        (2) a second lever pivotable about a second relatively fixed point,
        (3) said second lever adapted to be responsive to said spring,
        (4) said second lever having an end adapted to abut said first lever,
    (b) wherein said rupturable member opposes rotation of said first lever.

7. A pantograph as set forth in claim 4, wherein:
    (a) said snap-action means is normally in a stable state,
    (b) said snap-action means is adapted to break upon an upset in equilibrium caused by abnormal force acting on said counter-lever.

8. A pantograph as set forth in claim 7 wherein:
    (a) said snap-action means comprises:
        (1) a first lever pivotable about a relatively fixed point and having an end,
        (2) a second lever pivotable about a second relatively fixed point,
        (3) said second lever adapted to be responsive to said spring,
        (4) said second lever having an end adapted to abut said first lever,
    (b) wherein said end of first lever and said end of said second lever form a toggle joint.

9. A pantograph as set forth in claim 8 wherein:
    (a) one of said first and second levers carries at its end a roller, and
    (b) the other of said first and second levers carries at its end a flat surface perpendicular to said other lever,
    (c) said roller normally contacting said flat surface, and
    (d) said roller adapted to escape said flat surface upon application of abnormal forces to said counter-lever.

10. A pantograph as set forth in claim 4 further comprising:
    (a) a fluid pressure system adapted to extend said articulated support,
    (b) said snap-action means including,
        (1) a first lever pivotable about a relatively fixed point,
        (2) a second lever pivotable about a second relatively fixed point,
        (3) said second lever adapted to be responsive to said spring,
        (4) said second lever having an end adapted to abut said first lever,
    (c) first and second electrical contacts through which said fluid pressure system is controlled,
    (d) said contacts disposed on either side of said first lever,
    (e) whereby raising and lowering of said first lever control said fluid pressure system.

11. A pantograph as set forth in claim 1 further comprising:
    (a) a fluid pressure system adapted to raise and lower said articulated support,
    (b) said triggering device including an extensometric gauge operatively mounted on said counter-lever,
    (c) said safety device including a servo control means,
    (d) said extensometric gauge having an output operatively connected as an input to said servo control means, (e) said servo control means having an output operatively connected to control said fluid pressure system.

References Cited

UNITED STATES PATENTS

| | | | |
|---|---|---|---|
| 454,532 | 6/1891 | Verstraete | 191—66 |
| 1,212,326 | 1/1917 | Colton | 191—89 |
| 1,654,661 | 1/1928 | Meyer | 191—68 |
| 2,490,909 | 12/1949 | Larsson | 191—66 |
| 2,935,576 | 5/1960 | Faiveley | 191—68 |
| 3,238,314 | 3/1966 | Faiveley | 191—66 |

ARTHUR L. LA POINT, *Primary Examiner.*

D. F. WORTH III, *Assistant Examiner.*

U.S. Cl. X.R.

191—85